United States Patent [19]

Stearns, Jr.

[11] Patent Number: 4,702,437

[45] Date of Patent: Oct. 27, 1987

[54] ELECTRIC AIR-DRIVEN HELICOPTER

[76] Inventor: Hoyt A. Stearns, Jr., 4131 E. Cannon Dr., Phoenix, Ariz. 85028

[21] Appl. No.: 699,460

[22] Filed: Feb. 7, 1985

[51] Int. Cl.$^4$ .............................................. B64C 27/16
[52] U.S. Cl. .................................. 244/17.11; 416/148; 416/22; 244/17.19
[58] Field of Search ........... 416/22, 20 R, 171, 190 B, 416/99, 102, 148; 244/58, 207, 17.25, 17.11

[56] References Cited

U.S. PATENT DOCUMENTS

| | | | |
|---|---|---|---|
| 1,697,009 | 1/1929 | Isacco | 416/23 |
| 2,301,417 | 11/1942 | Larsen | 416/20 R |
| 2,368,630 | 2/1945 | Bizjak | 244/58 |
| 2,474,359 | 6/1949 | Isacco | 416/22 |
| 2,568,812 | 9/1951 | Lee | 244/52 |
| 2,724,446 | 11/1955 | Hill | 244/17.25 |
| 2,845,131 | 7/1958 | Laufer | 416/18 |
| 2,917,895 | 12/1959 | Boushey | 60/39.35 |
| 2,931,441 | 4/1960 | Root | 416/22 |
| 2,941,600 | 6/1960 | Koning | 416/22 |
| 2,984,304 | 5/1961 | Ranson | 416/22 |
| 3,010,678 | 11/1961 | Gose | 244/17.11 |
| 3,119,577 | 1/1964 | Andrews | 244/7 R |
| 3,178,131 | 4/1965 | Laing | 244/206 |
| 3,186,491 | 6/1965 | Fischer | 416/20 R |
| 3,259,195 | 7/1966 | Chaney | 416/20 R |
| 3,370,809 | 2/1968 | Leoni | 244/7 R |
| 3,482,803 | 12/1969 | Lindenbaum | 244/17.11 |
| 3,830,588 | 8/1974 | Nagler | 416/20 R |
| 4,473,335 | 9/1984 | Henry | 416/20 A |

FOREIGN PATENT DOCUMENTS

| | | |
|---|---|---|
| 595915 | 4/1934 | Fed. Rep. of Germany . |
| 1002007 | 3/1952 | France . |
| 419603 | 4/1947 | Italy . |
| 895051 | 6/1958 | United Kingdom . |
| 938459 | 10/1963 | United Kingdom . |

Primary Examiner—Galen Barefoot
Assistant Examiner—Mark R. Valliere
Attorney, Agent, or Firm—LaValle D. Ptak

[57] ABSTRACT

A helicopter has a low profile electric motor mounted in each of the rotor blades to drive a cross-flow fan which draws air in through a slot at the leading edge of the blade and forces it out through an opposing slot adjacent the trailing edge of the blade to provide the thrust for rotating the rotor blade. An engine is located in the fuselage of the helicopter for driving an electric generator to produce the electricity supplied to the motors mounted in the blades. In addition, yaw control is achieved without the necessity of tail structure or a tail rotor using a small electric motor driving or absorbing power from the main rotor shaft. Both the yaw control motor and the main rotor shaft tilt together as a rigid unit. Pitch and roll control is achieved without the necessity of aerodynamic surfaces by movement of the main rotor support mast about a gimbal bearing support located above the center of gravity of the helicopter.

11 Claims, 9 Drawing Figures

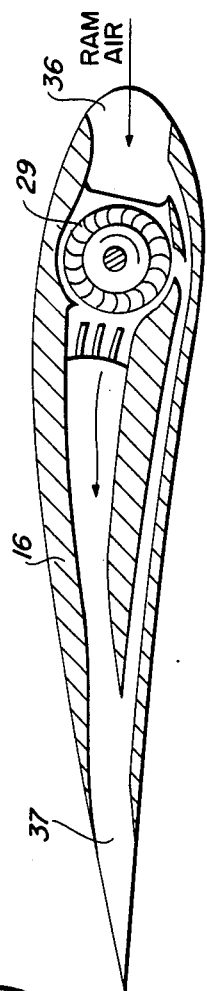
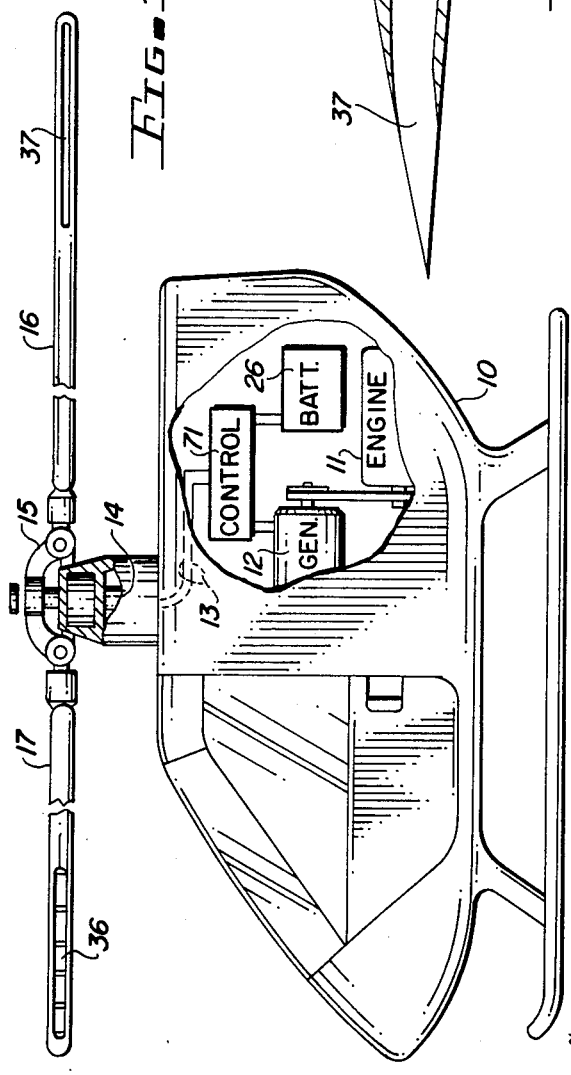
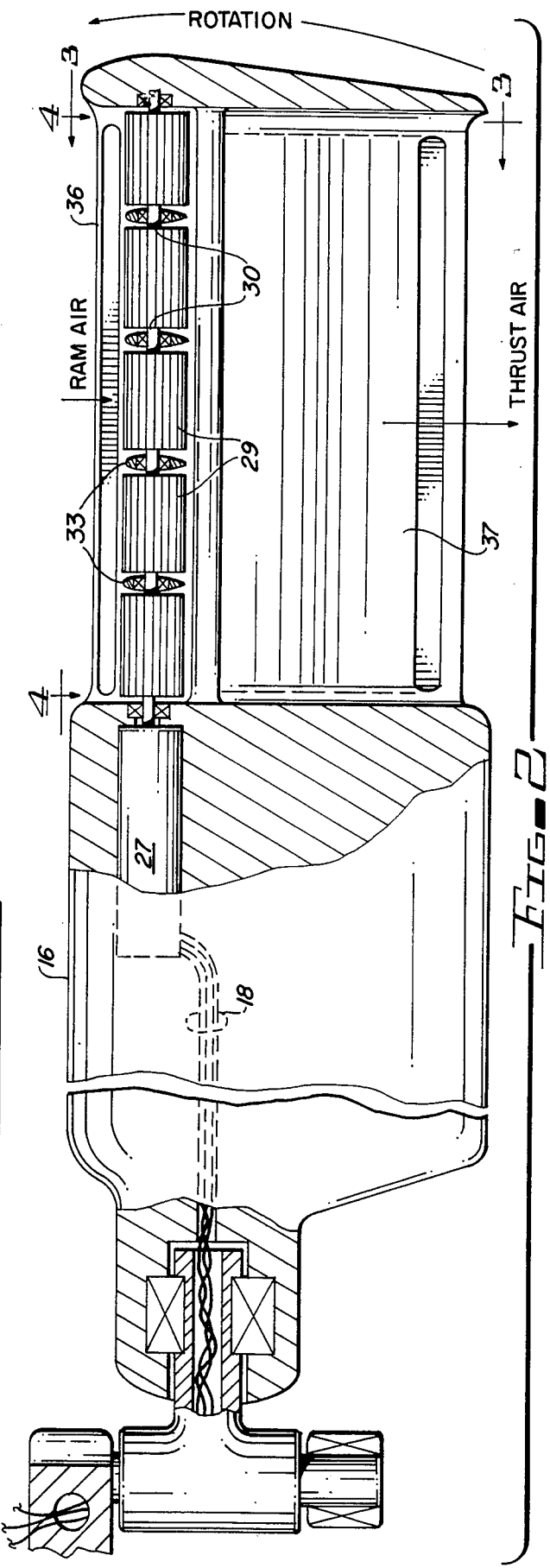

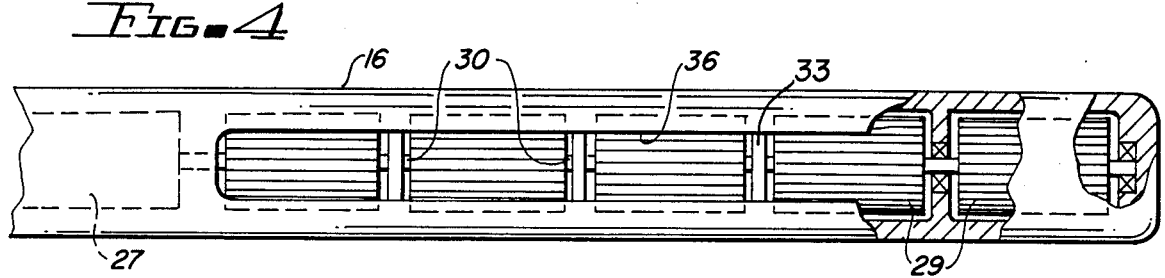
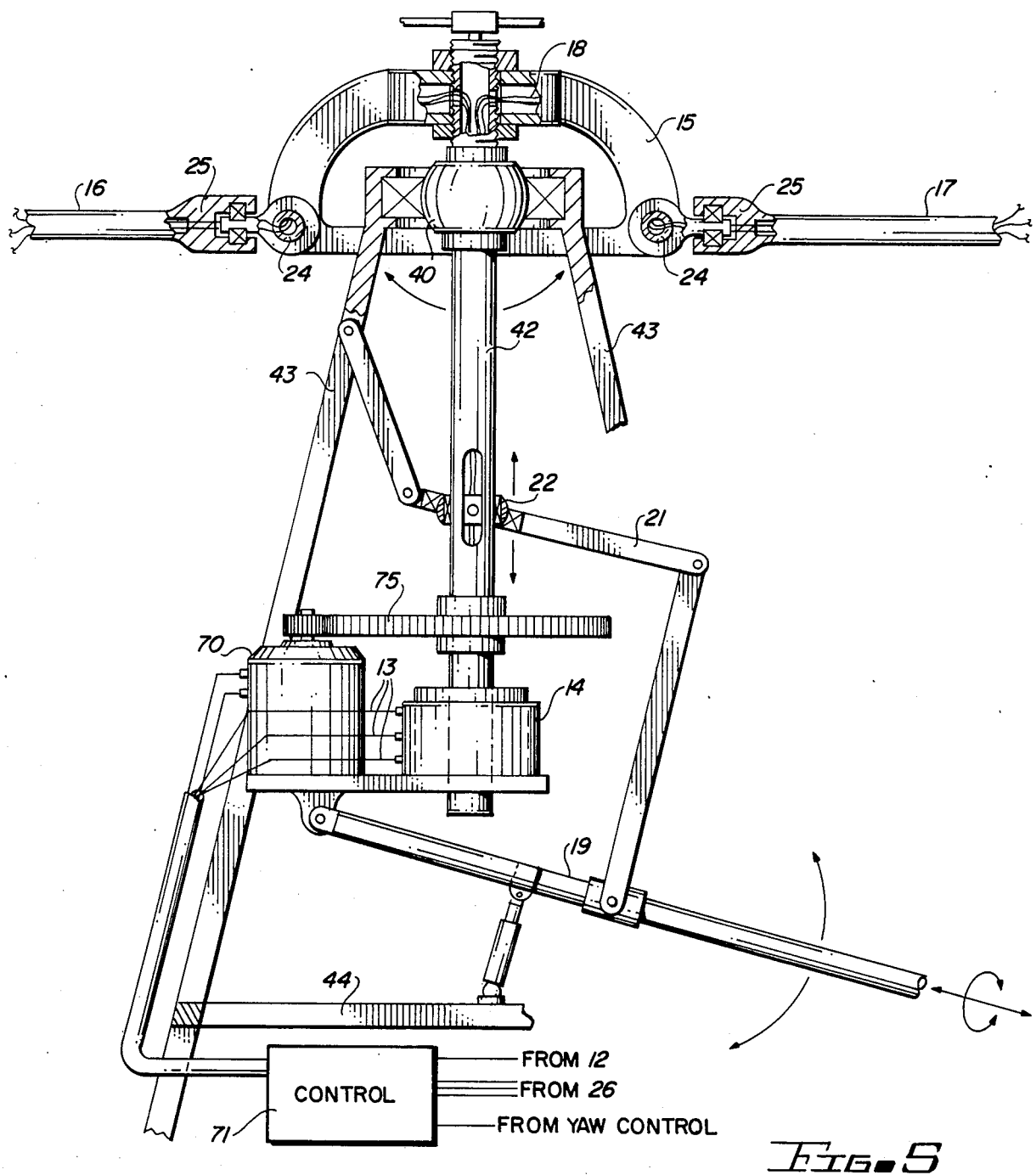

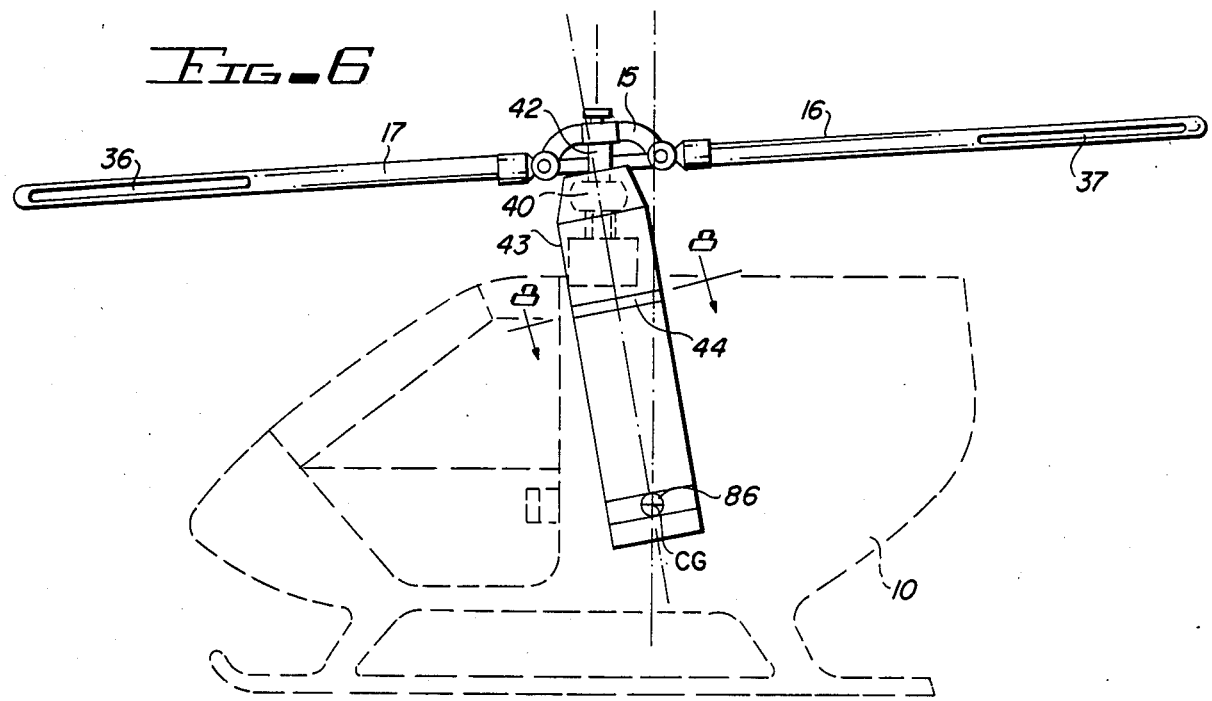
Fig-6
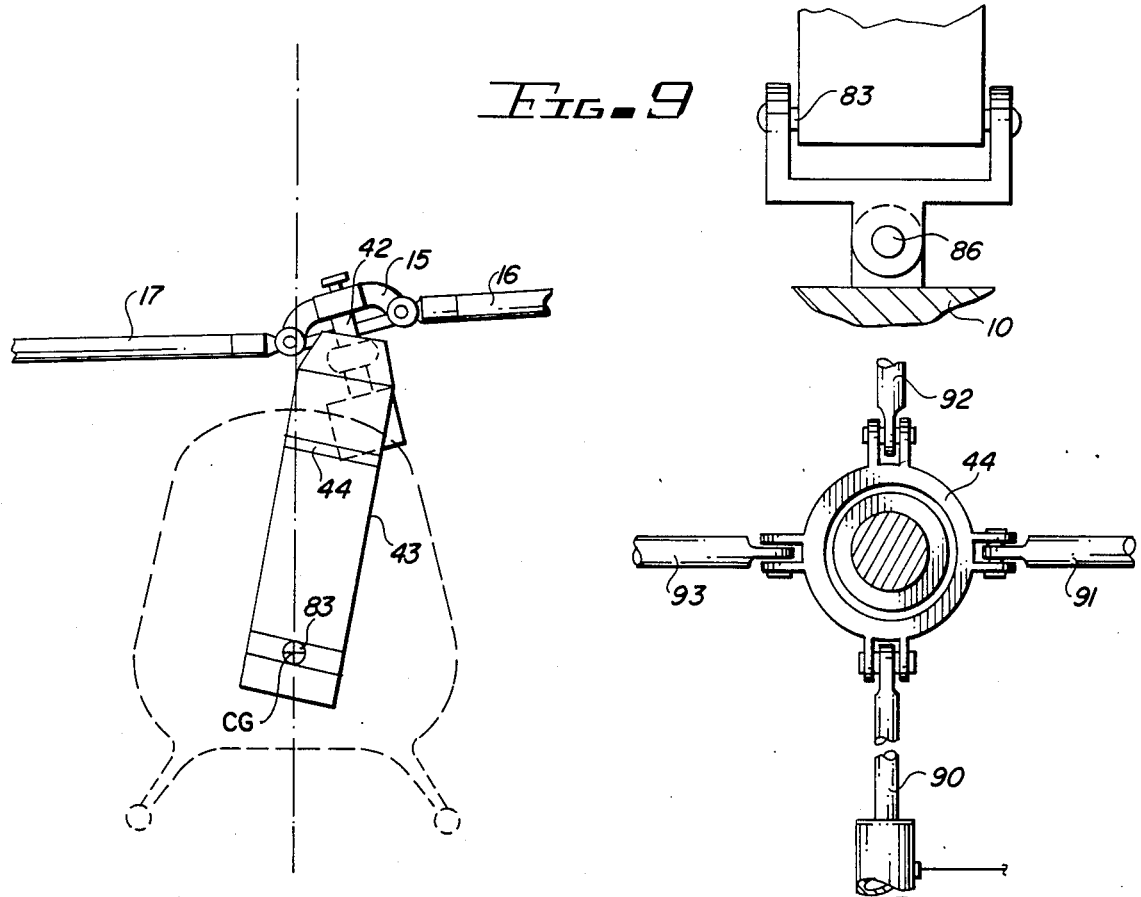
Fig-9
Fig-7
Fig-8

ELECTRIC AIR-DRIVEN HELICOPTER

BACKGROUND OF THE INVENTION

This invention relates to helicopters and more specifically to air-driven helicopters in which a flow of air exiting from the rotor blades near the tip is used to provide the necessary rotation of the rotor blades.

The most common construction for helicopters, which historically has been used and which generally is employed both in commercial and military helicopters at the present time, is to cause the rotor of the helicopter to rotate by mechanical interconnections of the rotor to an engine through various types of mechanical transmissions. Several disadvantages are inherent in such conventional systems, whether an internal combustion engine is used as the primary power source or whether a turbine engine is employed. A primary disadvantage is that significant high torque loads are placed on the structure which is used to support the vertical shaft connecting the rotor blades with the engine. This torque must be counteracted to prevent a counterrotation of the body of the helicopter with respect to the rotor. Typically, this is accomplished by the provision of an additional small tail rotor which is mounted in a vertical plane with its hub at right angles to the fore-aft axis of the helicopter body. The force which is applied to the body of the helicopter by the tail rotor is controlled by coordinating the pitch of the tail rotor with the driving power applied to the main rotor blades in order to obtain stable operation of the helicopter. An enormous amount of stress is placed on the body members of the helicopter fuselage as well as the transmission components used to interconnect the engine with both the main rotor and the tail rotor.

It is readily apparent that a large number of rotating and moving parts exist in a conventional helicopter in order to drive and control the two rotors. This is a significant disadvantage because many bearings, operating under significant stress (rotational, centrifugal and the like), must be employed. These bearings and the other moving mechanical parts are costly and require frequent and expensive maintenance. In fact, the maintenance and repair hours generally exceed the actual flight hours of such a helicopter. As a result, maintenance is a significant cost factor to be considered for the operation of a conventional helicopter.

Various attempts have been made to overcome the disadvantages of conventional mechanical drive train mechanisms. One approach is to place a jet engine or turbine at the end of each of the rotor blades. This removes the structural requirements placed upon the vertical rotor shaft in conjunction with the interconnection of the rotor to an engine located within the body of the helicopter. The hub of such a rotor-tip jet-turbine driven helicopter then can comprise a simple rotating disc or the like with its center at the vertical rotor support shaft. Significant fuel delivery problems, however, exist for supplying fuel from the body or fuselage of the helicopter up through the rotor support shaft and through the hub to the rotating blades. This presents an extreme safety hazard because of the high volatility of the fuel; and leaks between the hub, the non-rotating rotor shaft, and rotating rotor blade are difficult to prevent. Furthermore, the centrifugal force acting upon the fuel due to the rotating rotor blades changes depending upon the speed of the blade. This can result in either a too rich or too lean fuel mixture supplied to the engine. In addition, the jet engines must breath their own exhaust. Consequently, power failures occur with such helicopters unless complex control mechanisms are provided for controlling the fuel supply to the engines. Patents directed to such rotor tip jet driven helicopters are the U.S. Pat. Nos. to Root, No. 2,931,441; Boushey, No. 2,917,895; Lindenbaum, No. 3,482,803; Ranson, No. 2,984,304; and Gose, No. 3,010,678.

To take advantage of the simplified structural requirements of the rotor blade acting as a simple rotating disc, but without the problems of conveying volatile fuel to jet engines mounted on the tips of the rotor blades, various designs utilizing the flow of pressureized air delivered through a hollow rotor shaft to hollow blades have been developed. In systems using this general design, a flow of air passes through the rotor blades to nozzles or air reaction engines located at the tips of each of the blades and directed rearwardly. Consequently, air discharging through the nozzles results in reactive forces in the opposite direction to rotate the blades about the hub. A variety of attempts to develop practical helicopters using this concept of an air-driven rotor have been made in the past.

A recent air-driven helicopter system is disclosed in the patent to Nagler, U.S. Pat. No. 3,830,588. This patent discloses an air driven helicopter which has a hollow rotor shaft connected to an air compressor to convey a flow of air through the rotor shaft to the rotor hub. The hub rotates about the fixed shaft on ball bearings, with the enter line of the rotor blades concentrating a center of force which is primarily above the bearings. Separate air seals and a separate spherical bearing to handle the tilt of the rotor blades is required. In addition, flexible bellows are provided to accommodate the tilt functions of the rotors effected by the swash plate. Because of the relatively high temperature of the compressed air which is used in such a helicopter, the ball bearings and the air seals of the system disclosed in this patent require frequent maintenance. In fact, the high temperatures to which the ball bearings are subjected cause them to have very limited life.

Other prior art patents for air-driven helicopter rotors, which are subject to the same disadvantages present in the Nagler system described specifically above, are the U.S. Pat. Nos. to Laufer, No. 2,845,131; Andrews, No. 3,119,577; Leoni, No. 3,370,809; Chaney, No. 3,259,195; Fischer, No. 3,186,491; British Pat. No. 938,459; French Pat. No. 1,002,007 and Italian Pat. No. 419,603.

In an effort to overcome the disadvantages of short bearing life and high maintenance in air-driven helicopter rotors of the type disclosed in the Nagler patent, a helicopter rotor hub system employing high temperature graphite bearings in place of the ball bearings and separate seals of Nagler has been developed. This system is disclosed in the patent to Henry, U.S. Pat. No. 4,473,335. The rotor hub of the Henry helicopter comprises a section of a spherical stainless steel ball attached to the end of a hollow rotor shaft. As in Nagler, an air compressor is located within the helicopter fuselage to supply air to the hollow rotor shaft. This air discharges through the shaft to the hollow rotor blades which have discharge nozzles on the trailing edges of their tips. The sole support bearing for the blades is in the form of a cup-shaped concave graphite bearing which engages the stainless steel ball. The rotor blades are attached to this bearing. The high temperature graphite which is employed provides a lubrication-free bearing surface and also provides a seal against air leakage.

While the hub arrangement of the Henry Patent overcomes some of the disadvantages of air-driven helicopters, such helicopters, including those constructed in accordance with the Henry patent, are still less than half as efficient as a shaft driven helicopter. This is unacceptable for most uses because of the high cost of the fuel consumed and the necessity for storing large amounts of fuel (which inherently results in added weight) in the helicopter fuselage. The efficiency losses occur because of the relatively long path which must take place from the compressor located within the fuselage up through the support shaft and out through the entire lengths of the blades to the tips which limits the practical volume flow rate of air. Also, heat is lost from air along the path, reducing thrust, and the air must be accelerated to tip speed as it moves outward along the blade.

Consequently, it is desirable to provide an air driven helicopter which overcomes the disadvantages of prior art helicopters of the various types which have been discussed above. Preferably, a helicopter should be driven by air thrust at the tips of the rotor blades but without the necessity of ducting either fuel or air up through the support shaft and the blades to the blade tips. In addition, the number of moving parts in the helicopter should be reduced as much as possible in order to reduce the maintenance required.

SUMMARY OF THE INVENTION

Therefore, it is an object of this invention to provide an improved helicopter.

It is another object of this invention to provide an improved air-driven helicopter.

It is a further object of the invention to provide an improved rotor tip drive for a helicopter.

It is an additional object of this invention to provide an electric motor driven air compressor system for a rotor tip helicopter drive.

It is a further object of this invention to provide an improved electric powered helicopter.

In accordance with a preferred embodiment of this invention, a helicopter has at least one rotor blade with a leading edge and a trailing edge mounted for rotation on the fuselage of the helicopter. An electric motor is mounted within the rotor blade near its end, and a provision is made for supplying electrical power to the motor. A fan also is mounted for rotation within the rotor blade near its tip and is driven by the motor. Air is supplied to the fan from a slot in the leading edge of the blade and air exists from the fan outwardly toward the trailing edge of the blade to provide dynamic rotational thrusts to the blade.

BRIEF DESCRIPTION OF THE DRAWINGS

FIG. 1 is an overall view of a helicopter utilizing a preferred embodiment of the invention;

FIG. 2 is a partially broken-away top view of a rotor blade of a preferred embodiment of the invention;

FIG. 3 is a cross sectional view taken along the line 3—3 of FIG. 2;

FIG. 4 is a front view of the tip of the rotor blade shown in FIG. 2;

FIG. 5 is a partially broken-away view of the rotor mount in the rotor mast, illustrating additional features of the invention;

FIGS. 6 and 7 illustrate the mounting of the rotor mast in the fuselage; and

FIGS. 8 and 9 illustrate details of features of the rotor mast mount.

DETAILED DESCRIPTION

In the drawings the same reference numbers are used throughout the several figures to designate the same or similar components.

Reference first should be made to FIG. 1 which illustrates the various arrangements of parts of a preferred embodiment of the invention in a helicopter. The helicopter itself comprises a fuselage 10 which may be of any suitable configuration and size. Mounted within the fuselage 10 of the helicopter are an engine 11 driving an electrical power generator 12. Preferably, the generator 12 is an alternating current generator, but for some applications a direct current generator may be used. The engine 11 may be of any suitable type, either internal combustion or turbine. The manner in which the engine 11 is mounted and the location of fuel tanks and the supplying of fuel to the engine 11 may be in any of a number of conventional configurations. A back-up battery 26 also is mounted in the fuselage 10 to provide emergency power in the event the generator 12 fails.

The generator 12, for a typical 2 man helicopter, should be capable of producing 100 kilowatts of power. Power then is supplied from the generator 12 to a control system 71. From the control system 71, power passes through three conductors 13 and through a slip ring assembly 14 on a rotor shaft 42 to two sets of three conductors 18. The conductors 18 extend through an underslung hub assembly 15 which supports a pair of rotor blades 16 and 17. The hub assembly 15 is connected to rotate with the hollow shaft 42 through a spherical bearing 40. The two sets of conductors 18 are connected, respectively, to electric motors 27 located near the ends or tips of each of the blades 16 and 17.

The motor/fan mechanism for supplying air jet reaction power for rotating the blades 16 and 17 is shown in FIGS. 2, 3 and 4. The motors 27 are low profile high power electric motors suitably mounted on internal supports (not shown) in a location approximately 2 feet from the end of each rotor blade 16 and 17. It should be noted that, in the discussion here and to follow, reference to the rotor blade 16 applies equally as well to the rotor blade 17 since identical apparatus is employed in each rotor blade used in the helicopter.

The motor 27 is approximately 1.2 inches in diameter and is approximately 2 feet long. It is designed to operate at 150,000 rpm (revolutions per minute) and drives a one inch diameter cross flow fan 29, which also is approximately 2 feet long. Several mounting bearings 30 are provided along the length of the motor shaft and the fan 29. The bearings, in turn, are mounted in suitable openings in a support casting 33. The motor 27 and fan 29 preferably are manufactured as an integral and rigid assembly for mounting within the rotor blade 16. To obtain the small diameter profile of the motor 27, high energy rare earth permanent magnets such as samarium cobalt or neodymium boron iron (such as Colt Industries Crumax) are employed. The motor 27, utilizing these permanent magnet materials and having the dimensions described, is capable of developing approximately 40 horsepower. Thus, a 40 horsepower motor is mounted in each of the rotor blades 16 and 17 to provide the operating power for the helicopter.

As shown in FIG. 3, the high speed rotating fan 29 obtains intake air along its entire length through a slot 36 located in the leading edge of the blade 16 near its tip (also shown in FIG. 4). This air is accelerated or compressed by the fan 29 and is ejected to create approximately 35 pounds of thrust force through an elongated slot 37 located on the trailing edge of the blade opposite the slot 36, as shown most clearly in FIGS. 2 and 3.

The mass flow of air which is moved through each blade, such as the blade 16, by the fan 29 should be as high as possible within the constraints which necessarily are imposed by the geometry of the rotor blade 16. For a system having the parameters described above, approximately six pounds per second of air moves through each of the blades 16 and 17. This is substantially more than in a conventional air jet helicopter, such as the ones disclosed in the Nagler patent, U.S. Pat. No. 3,830,588 or Henry patent, U.S. Pat. No. 4,473,335 described previously. Helicopters of the type disclosed in both of those patents are limited by the duct cross sectional area inside the blade and by losses incurred through friction, turbulence and heat conduction in the passageways from the compressors located within the helicopter fuselage to the blade tips from which the compressed air exits.

Because the fan 29 is of a cross flow type, maximum efficiency and utilization of the ram air force from the air applied through the intake slot 36, when the blades are rotating at operating speed, is obtained because of the large crosssection area. The leading edges of the blades 16 and 17, where the air intake slots 36 are located, move at approximately 700 feet per second when the helicopter is flying. The acceleration given to the air by the fan 29 as the air passes through the blade is less than 200 feet per second to obtain the desired thrust. As a result, much more air is accelerated to a lower speed than in conventional air jet helicopters, where the source of the compressed air is in the fuselage; so that less energy is wasted in the propulsion air. In addition, as is readily apparent from an examination of FIGS. 2 and 3, there is minimal ducting loss and heat loss in the system which is disclosed. There is no air leakage through rotating seals and there is no additional pumping thrust required to accelerate the working air up to tip speed as it moves through the rotor blade. Also, heat produced by the motors 27 is added to the thrust air.

Since no air tight sealing requirements are necessary between the rotating rotor blades and the hub, the hub and support bearing for the rotor may be designed for optimum rotational efficiency without the necessity of compromise required for ducting air up through the support shaft to the blades. The manner of interconnecting the rotor blades with the hub may be effected in any of a number of configurations of the type commonly used with helicopter rotors.

Reference now should be made to FIGS. 5, 6, 7, 8 and 9, which illustrate details of a main rotor support system, which may be used in the electric air jet helicopter which has been described thus far. As illustrated in FIG. 5, the hub 15 is fixed rigidly to the shaft 42 at the upper end of the shaft. The shaft 42, in turn, freely rotates about its central axis and pivots through a spherical thrust bearing 40. The lower portion of the hub 15 has an opening in it to permit the hub to rotate freely about legs 43 of the rotor mast without interference. The rotor mast legs 43, in turn, are supported on a gimbal bearing assembly 83/86, shown most clearly in FIG. 9.

Mounted on the lower end of the shaft 42 is an assembly consisting of the slip ring assembly 14, a small direct current electric motor 70, and a gear drive train unit 75. The unit 75 is used to interconnect the motor 70 and the shaft 22 for common, simultaneous rotation.

The rotor blades 16 and 17 are attached to the hub 15, and these blades are free to cone and feather through bearings 24 and 25. Power is delivered to the electric tip motors 27 by way of the conductors 18, running from slip rings in the assembly 14 up through the hollow center of the shaft 42 and out along the blades 16 and 17.

The assembly is kept from rotating with respect to the fuselage 10 of the helicopter by means of a linkage 19. This linkage 19 also is used to pivot the shaft 42 in the spherical bearing 40 and to actuate the collective pitch control slider 21. Slider 21 is used to effect the vertical travel of a bearing 22, the inner race of which is attached to a pin passing through an elongated slot in the shaft 42 for effecting the pitch control. This is a conventional pitch control and no further discussion is considered necessary here.

From an examination of the structure of FIG. 5, it can be seen that the rotor blades 16 and 17 are free to rotate about the axis of the shaft 42, since they rotate with it by virtue of their connection to the hub 15. Ideally, the rotation of the shaft 42 should be a "frictionless" rotation. However, there is some friction in the bearings 40 and 22 and the slip ring assembly 14, which tends to rotate the entire helicopter fuselage 10 along the yaw access in the direction of rotation of the main rotor blades 16 and 17. In addition, it is necessary, in a practical helicopter, to be able to apply a rotational force along the yaw access in either direction for directional control. Forces of this type are provided in a conventional helicopter by the tail rotor. As mentioned previously, the small electric motor 70 (typically 5 peak horsepower) is mechanically linked to the shaft 42 through the gear assembly 75. In addition, the assembly also is linked to the helicopter body for forward and reverse adjustment of the vertical orientation of the shaft 42 and side-to-side vertical adjustment of the shaft 42 by means of the link 19 to the helicopter body.

The motor 70 is operated either as a motor or a generator in accordance with control signals applied to it from a control box 71 over a pair of leads. The control box includes rectifier circuitry for converting the alternating current supplied to it from the generator 12 to direct current for utilization by the motor 70. Alternatively, direct current is supplied directly from the battery 26 over leads 24 in the event the generator 12 should fail to operate for any reason, including failure of operation of the engine 11.

By means of control signals applied to the control box 71, the motor 70 may be operated to apply a torque in either direction along the yaw access of the helicopter in order to achieve directional control and to counteract friction in the rotor system. When the motor 70 is operating as a generator, it supplies power back through the leads 72 to the control box 71 where this power is converted to alternating current power and is added to the power from the generator 12 to power the tip motors 27. Consequently, the power generated by the rotation of the shaft 42, as applied to the motor/generator 70, is fully utilized.

The structure which is employed in FIG. 5, functioning through the yaw control motor/generator 70 and the assembly 75, eliminates the need for a tail rotor or tail structure on the helicopter fuselage 10. Of course, a conventional helicopter structure, using a tail rotor, may be employed if this function is not desired. In such a case, the motor 70, unit 75 and the associated apparatus which has just been described could be eliminated. The electric air jet thrust power for the helicopter is the same in either event.

In a conventional helicopter, which has the main rotor mounted on a fixed mast, the fuselage tends to pitch forward in forward flight because the aerodynamic drag on the fuselage is below the aerodynamic thrust supplied by the forward tilted rotor mounted on the fixed mast. This pitching moment is counteracted in a conventional helicopter by a horizontal tail fin at the end of the tail boom. This tail fin causes a considerable downward force on the tail boom, which partially prevents the helicopter from pitching forward in forward flight, thus, partially compensating for the rotor thrust offset. The horizontal tail fin, however, adds drag to the helicopter; and because the downward force must be compensated by increased lift by the main rotor, the efficiency of such a conventional helicopter is reduced.

In the use of rotor hubs 15 of the type shown in FIG. 5, there also is a moment applied to the hub due to the centrifugal force of the blades, if the rotational plane of the blades is offset from the rotational plane of the hub. This moment causes additional pitching or rolling of the fuselage of the helicopter.

Because there is no direct mechanical connection of the main rotor shaft 42 to the engine 11 in the helicopter which has been described above, it is feasible to move and tilt the main rotor shaft 42 in any manner with respect to the fuselage 10. If the main rotor support structure 43/44 or mast is moved in flight so that the main rotor thrust vector is nearly colinear with the sum of the weight and drag vectors of the fuselage 10. The result is that there will be little pitching moment in flight.

The manner in which this is done is to mount the entire mast assembly 43/44 on a gimbal support, slightly above the center of gravity of the helicopter. This is illustrated in FIGS. 6 to 9. The mast 43/44, which supports the mechanism illustrated in FIG. 5 through the spherical thrust bearing 40, is attached to the fuselage 10 of the helicopter through a fore/aft bearing set 83 and a port/starboard bearing set 86, which together form a gimbal bearing set. Consequently, the rotor mast 43/44 can be pivoted about a point slightly above the fuselage center of gravity and vertically near the aerodynamic center of pressure of the fuselage 10. The bearings 83 and 86 are located near the aerodynamic center of pressure axis of the fuselage and above the center of gravity of the fuselage 10.

As the forward speed of the helicopter increases, the rotor mast 43/44 is tilted forward to align the total thrust of the rotor with the direction of the force resulting from the weight and aerodynamic drag of the fuselage 10. Consequently, there is little forward pitching moment in forward flight. Since the mast 43/44 is pitched forward as shown in FIG. 6, the shaft 42 and, thus, the hub 15 must be oriented to cause the rotor blades 16 and 17 to rotate essentially horizontally with respect to the longitudinal axis of the helicopter fuselage 10 and this is done through the back and forth (left to right, as viewed in FIG. 5) movement of the linkage 19 to cause the relative orientation shown in FIG. 6. In general, the rotor mast 43/44 can be moved as required to keep the fuselage at any any desired pitch and roll angle without any efficiency penalty.

By rotating the rotor must 43/44 to one side (the left side of the helicopter fuselage, or to the right as viewed in the front view of FIG. 7), much faster forward flight of the helicopter may be achieved, because the retreating blade (the one moving toward the rear of the helicopter) does not carry much load. The concept which is accomplished here is effected by rotating the mast about the longitudinal axis through the bearings 83 of the gimbal bearing assembly, 83/86. Helicopters, which employ an advancing blade concept, use two counterrotating rigid blades to accomplish similar results. Counterrotating blades add a substantial amount of complexity to any helicopter employing such an operation.

By utilizing a side-tilted rotor mast 43/44, a modified advancing blade concept results. As the forward speed of the helicopter increases, the rotor mast 43/44 is provided with correspondingly increased tilt to the left side of the fuselage (to the right in the front view of FIG. 7) and the rotor shaft, through rotation of the linkage 19 is tilted more to the opposite side (left in the front view of FIG. 7). Cyclic feathering control keeps the rotor blades 16 and 17 level. The hub 15 is now tilted opposite to the mast; and, due to the offset flapping hinges 24/25, there is a large moment on the hub 15. Since the fuselage 10 of the helicopter is offset to the right side of the hub 15, the helicopter is in equilibrium, with the advancing blade supporting more weight than the retreating blade. Because the hub 15 is to the left of the fuselage, there is a large yaw moment. This is cancelled by the shaft motor 70 (which, for helicopter utilizing the construction of FIGS. 6 and 7, is larger than the 5 horsepower motor previously described) acting as a generator. Consequently, the large yaw correction moment is efficient and the yaw torque is put to work to power the tip motors 27.

FIG. 8 illustrates the manner in which the front-to-back and side tilt of the rotor mast 43/44 may be effected. Four high speed push-pull motor drive units 90, 91, 92 and 93 are coupled to the front, back, left and right sides of the plate 44 to move it and the mast to the various positions described above and shown in FIGS. 6 and 7.

Various modifications may be made to the helicopter which has been described above and which is shown in the drawings. The embodiments which have been described and which are shown are to be considered as illustrative of the invention and not as limiting. For example, fan configurations other than the two which have been described may occur to those skilled in the art. Also, a variety of different hub/rotor mountings arrangements may be employed with any desired number of blades without departing from the scope of the invention. Other variations also will occur to those skilled in the art without departing from the true scope of the invention as defined in the claims.

What is claimed is:

1. In a helicopter having a fuselage and at least one rotor blade having a hub end and a tip end and having a leading edge and a trailing edge, said blade mounted for free rotation on the fuselage, an improvement including in combination:
   an electric motor mounted in said rotor blade:
   power producing means located in the fuselage of said helicopter for providing electrical power;
   means for supplying electrical power from said power producing means to said motor;
   a cross-flow fan mounted for rotation in said rotor blade near the tip thereof and coupled to said motor to be rotated thereby;
   means for supplying air through the leading edge side of said blade to said fan;

means for delivering air from said fan outwardly from the trailing edge side of said blde to provide the sole dynamic rotational thrust to said blade;

a support shaft having a central axis;

a hub interconnected with said support shaft, said rotor blade being coupled to said hub to rotate therewith;

means for attaching said support shaft to the fuselage of said helicopter to a bearing for free rotation therethrough; and means connected to the fuselage of said helicopter for applying bi-directional relative rotational yaw control torque between said fuselage and the central axis of said support shaft to generate counteracting yaw rotational forces to the fuselage.

2. The combination according to claim 1 wherein said power producing means includes generator means mounted in the fuselage of said aircraft.

3. The combination according to claim 2 wherein said means for supplying electrical power comprises electrical connectors between said generator means and said motor.

4. The combination according to claim 2 wherein said motor and said fan are mounted within said rotor blade, and said means for supplying air through the leading edge side of said blade comprises a slot in the leading edge of said blade adjacent said fan, and said means for delivering air from said fan outwardly through the trailing edge of said blade comprises a slot adjacent the trailing edge of said blade from which air is delivered from said fan.

5. The combination according to claim 4 wherein said cross-flow fan rotates on an axis which is substantially parallel to the leading edge of said rotor blade, and wherein said electric motor is located between said fan and the hub end of said blade and operates at speeds in excess of 100,000 rpm.

6. The combination according to claim 3 further including hub means; and means for mounting said blade on said hub means; and wherein said means for supplying electrical power from said generator means to said motor includes power transfer means in said hub means.

7. The combination according to claim 1 wherein said means for applying yaw control torque to said shaft comprises means connected between said shaft and the fuselage of said aircraft.

8. The combination according to claim 7 wherein said means for applying yaw control torque to said shaft includes electric motor means mounted in said fuselage and coupled to said shaft for applying rotational forces to said shaft to generate counteracting yaw rotational forces to the fuselage.

9. In an air-jet helicopter having a fuselage and at least one rotor blade with a hub end and a tip end and having a leading edge and a trailing edge, said blade mounted for rotation on the fuselage, an improvement including in combination:

a bearing mounted on the fuselage;

a support shaft having a central axis, said support shaft attached to the fuselage of said helicopter through said bearing for free rotation therethrough;

a hub mounted on said support shaft;

said rotor blade being mounted on said hub; and means connected to said fuselage for applying bidirectional relative rotational yaw control forces between said fuselage and the central axis of said support shaft to generate counteracting yaw rotational forces to the fuselage.

10. The combination according to claim 9 wherein said means for applying bidirectional rotational forces to said shaft includes electric motor means mounted in said fuselage and coupled to said shaft for applying rotational forces to said shaft to counteract rotational forces applied to the fuselage by rotation of said rotor blade.

11. The combination according to claim 10 wherein said electric motor means also acts as a generator to recover power from said shaft when applying at least some of said rotational forces to said shaft.

* * * * *